United States Patent [19]

Sugar

[11] Patent Number: 5,790,538
[45] Date of Patent: Aug. 4, 1998

[54] SYSTEM AND METHOD FOR VOICE PLAYOUT IN AN ASYNCHRONOUS PACKET NETWORK

[75] Inventor: Gary Sugar, Rockville, Md.

[73] Assignee: Telogy Networks, Inc., Germantown, Md.

[21] Appl. No.: 592,586

[22] Filed: Jan. 26, 1996

[51] Int. Cl.$^6$ .......................... H04L 12/28; H04L 12/56; H04J 3/06

[52] U.S. Cl. .......................... 370/352; 370/389; 370/392; 370/516; 375/371; 379/93.01

[58] Field of Search .......................... 370/473, 474, 370/389, 392, 350, 412, 471, 517, 452, 445, 260, 267, 477, 352, 435; 375/371, 373, 354; 395/558; 379/93, 159, 202, 93.01, 93.08

[56] References Cited

U.S. PATENT DOCUMENTS

| | | | |
|---|---|---|---|
| 4,849,969 | 7/1989 | Annamalai | 370/517 |
| 4,866,704 | 9/1989 | Bergman | 370/452 |
| 4,961,188 | 10/1990 | Lau | 370/517 |
| 5,255,274 | 10/1993 | Holden et al. | 370/474 |
| 5,361,261 | 11/1994 | Edem et al. | 370/445 |
| 5,450,450 | 9/1995 | Lee | 370/395 |

*Primary Examiner*—Wellington Chin
*Assistant Examiner*—Melissa Kay Carman
*Attorney, Agent, or Firm*—Roberts & Brownell, LLC

[57] ABSTRACT

A System for Voice Playout in an Unsynchronized Packet Network for use with isochronous and asynchronous data transmission over a communication network having at least one receiving unit and at least one transmitting unit each having independent clocks. A FIFO voice codeword storing device in the receiving unit removes timing jitter from incoming packets—and receives voice packets from a data network. A phase continuous packet clock thereafter removes packets from the FIFO voice codeword storing device which is synchronized to the incoming data rate using the fill status of the FIFO voice codeword storing device as a frequency control signal. A continuous phase resampler removes timing frequency offset without causing packet slips or loss of data. The transmitter inserts the contents of a free running packet counter into each transmitted packet, allowing the receiver to detect lost packets and to properly reproduce silence intervals during Playout. A receive sequence counter increments at the local packet rate to schedule Playouts for multiple voice segments. A clock frequency recovery is utilized where the receiver clock frequency differs from the transmitter clock frequency. When the receive clock is not available, such as voice over packet networks applications, the FIFO voice codeword storing device fill status can control the resampling rate.

20 Claims, 6 Drawing Sheets

SYSTEM AND METHOD FOR VOICE PLAYOUT IN AN ASYNCHRONOUS PACKET NETWORK

FIELD OF THE INVENTION

The present invention relates generally to a system for voice Playout in an unsynchronized packet network. In particular, the present invention provides the means to synchronize a receiving clock's frequency with a transmitting clock's frequency during isochronous Playout of voice packets and voice band data packets.

BACKGROUND AND DESCRIPTION OF THE RELATED ART

Quality data transmission is crucial to communication networks throughout the world. Typically these communication networks transmit voice and video communications, as well as computer or other real-time traffic between communication ports. As such, isochronous, asynchronous, and plesiosynchronous data must be transmitted over a network instantaneously and without data loss. In some circumstances the above communications must also be transmitted simultaneously.

Current technology permits the above communications, typically voice data, to be digitized and transmitted via packets in a network system. Customarily PCM, or Pulse Code Modulation, techniques digitize a voice by sampling sound waves and converting each sample into a binary code, e.g. digital code. To transmit the binary code between communication ports, receiving and transmitting systems are needed. Typically, the receiving and transmitting systems are modems, telephones or other communication ports. Using this technology, a receiving system and a transmitting system typically support independent clocks which have precisely matched frequencies in order to avoid loss of data or jitter. It is a common occurrence, however, to have the receiving system's data clock differ in frequency from the transmitter's clock frequency. This frequency difference, even if minute, is especially a problem during isochronous Playout of voice packets and voice band data packets. If left unaddressed this frequency mismatch causes the sample buffer in the receiving unit to overflow or collapse. This in turn results in poor quality voice Playout, or in the case of voiceband data, a reset of the modem, or if sending encrypted data a complete loss of information. As such, packet networks require that the systems be synchronized, or the loss of packets must be tolerated.

Several schemes have been proposed to synchronize the transmitter's clock frequency to the receiving clock's frequency in isochronous and asynchronous data network systems, which, in turn, would eliminate jitter and data loss. Currently, none of the disclosed systems synchronize the transmitting clock and receiving clock frequency in a isochronous and asynchronous data network system in an efficient and reliable manner. Characteristically, the current systems attempt to manipulate the data stream in the network or the buffers to synchronize the transmitting and receiving clocks' frequencies without regard to resampling the encoded data for accurate frequency synchronization or centering the FIFO in order to smooth out jitter during Playout. For example, U.S. Pat. No. 4,849,969 to Annamalai ('969) discloses a smoothing apparatus for an independently clocked network for avoiding deletion of data from an interpacket gap due to the differences in the clock frequencies of different transmitting and receiving stations. Generally, the '969 teaches a method and apparatus for preserving a minimum or maximum interpacket gap length in an independently clocked data network by utilizing a smoother which is placed downstream of an elastic buffer in a network system. The smoother detects the occurrence of short or long preambles—i.e. those streams that have fewer or more than the threshold number of bytes, respectively—in an arriving stream of bytes. In the instance of a short preamble, the smoother inserts idle bytes into the stream wherein the arriving idle bytes are delayed by an appropriate idle byte clock period by storing them in a FIFO sequence register. If the smoother detects long preambles, then it deletes an appropriate number of idle bytes from the data stream. Deletion of the data stream reduces the length of the FIFO sequence of delay registers.

U.S. Pat. No. 4,961,188 to Lau discloses a synchronous frequency encoding technique for clock timing recovery in a broadband network. More particularly, this invention teaches a synchronous frequency encoding technique for circuit emulation of real time circuit switched asynchronous transfer mode (ATM) networks by providing for recovery of a source node service clock frequency at the destination node in a synchronous network wherein the source and destination nodes are controlled by timing signals derived from a single master clock. In accordance with the present invention, the frequency difference between the service and source node clock is encoded during the packetizing of the isochronous service signal into the cells that are transported through the ATM network. The encoded cells are transferred to the destination node clock where it is used as a basis for establishing a frequency of the destination node clock. As such, the source node control clock is of a greater frequency than that of the service signal resulting in a data under flow condition. The timing stream of the destination node is regularly gapped by inserting the period of delay according to the ratio of flagged cells in the service transmission caused by the under flow condition, thereby reducing the timing stream by the noted frequency difference and reproducing the original service signal frequency.

U.S. Pat. No. 4,866,704 to Bergman discloses a fiber optic voice and data network system that supports ordinary data packet traffic simultaneously with synchronous voice traffic over a common token ring channel. A voice interface module parses, buffers, and resynchronizes the voice data to the packet network employing elastic buffers on both sides of the sending and receiving ends. Clock information is passed across the boundaries by preceding the token with an idle period of non-transmission which allows the token to be used to re-establish a clock synchronized to the data. The elastic receiving buffers are monitored by averaging the size of the buffers to prevent an overflow or collapse of information.

U.S. Pat. No. 5,361,261 to Edem et al. discloses a frame-based transmission of data over a network, wherein the data transferred is packet data mixed with isochronous data. The present invention transmits packet source data in a frame structure by re-timing the data using a buffer to position bit groups of the data into predetermined time slots of recurring time frames or templates. In essence, both packetized data and non packetized data, e.g., isochronous data, are transmitted in predetermined slots of recurring time frames. This system is preferably implemented in a star topology network with data sources transmitting to a central hub, which, in turn, transmits the data to data sinks. To reduce the delay or jitter a predetermined amount of buffering is selected.

A system for overcoming the shortcomings of existing systems would synchronize the receiving clock to the incoming data rate utilizing the input FIFO in conjunction with frequency control signal methods. This system would also use a variety of controls and data stream transmissions to synchronize the frequencies of the transmitting and receiving clocks so as to eliminate data loss and jitter from the network system. Such a system would also utilize a variety of data fields to maintain temporal integrity and frequency synchronization between a transmitting and receiving clock. This design would also enable a counter to increment data streams to further synchronize the frequency of the transmitting and receiving clocks. Once the system is synchronized no data loss or jitters would result during the transmission of data. This design would also compensate for lost packets in the network.

SUMMARY OF THE INVENTION

It is therefore an object of the present invention to provide a method to derive a receive packet clock which utilizes an average input FIFO level or depth.

It is a further object of the present invention to provide a packet Playout method that utilizes a packet sequence number to automatically compensate for lost packets in a network system.

It is still a further object of the present invention to provide a method to feed forward a receive packet clock into a resampler that compensates for the receive and transmit frequency mismatch.

These and other objects and advantages of the present invention will be apparent to those persons skilled in the art upon examination of the detailed description of the invention, the drawing figures, and the appended claims.

The "System for Voice Playout in an Unsynchronized Packet Network" ("the present invention") is contemplated for use with isochronous and asynchronous data transmission over a communication network having at least one receiving unit and at least one transmitting unit. Both the receiving unit and the transmitting unit have independent clocks, and receivers and transmitters, respectively. In the present invention a FIFO voice codeword storing device in the receiving unit removes timing jitter from incoming packets—and receives voice packets from a data network. A phase continuous packet clock thereafter removes packets from the FIFO voice codeword storing device. The phase continuous packet clock is synchronized to the incoming data rate using the fill status of the FIFO voice codeword storing device as a frequency control signal. A continuous phase resampler removes timing frequency offset without causing packet slips or loss of data.

The transmitter of the present invention inserts the contents of a free running packet counter into each transmitted packet, allowing the receiver to detect lost packets and to properly reproduce silence intervals during Playout. A last packet replay request is inserted into the FIFO voice codeword storing device if it detects the loss of one or more packets. The sequence number of the first packet of the voice segment following the silence interval indicates to the receiver the duration of the silence interval. The receiver then duplicates the silence interval during Playout by inserting an appropriate delay into the FIFO voice codeword storing device when the voice packet is received.

The present invention further comprises a receive sequence counter which increments at the local packet rate to schedule Playouts for multiple voice segments. Upon arrival of the first packet in the voice segment, the system sets the receiving sequence equal to the sequence number of the incoming packet and inserts a delay of several packets into the FIFO voice codeword storing device before inserting the first codeword of the segment. The FIFO voice codeword storing device delay has the effect of centering the FIFO voice codeword in order to smooth out jitter during Playout. After centering the FIFO voice codeword storing device, the entire voice segment is played out in a uniform rate. Once the FIFO empties, white noise is generated until the arrival of the next voice segment. When the next packet is received, the FIFO voice codeword storing device is set to replicate the correct silence interval between the two voice segments.

A clock frequency recovery is utilized in the present invention where the receiver clock frequency differs from the transmitter clock frequency. If the average FIFO voice codeword storing device is increasing (decreasing) the system corrects the situation by increasing (decreasing) the packet Playout rate. This rate must also be applied to the PCM buffer. The clock recovery circuit updates the packet Playout rate in order to keep the average FIFO size within reasonable limits. If the average FIFO voice codeword storing device size exceeds the nominal FIFO voice codeword storing device center point plus a threshold, the play rate is increased and entered. When the FIFO voice codeword storing device size returns to acceptable limits, the nominal state is reentered and the nominal Playout rate is used.

Voiceband signals entering and exiting the PCM codec are sampled using the same sample clock. The received voice signal at the input to the resampler is over sampled by a factor of N using FIR (finite impulse response based on a unit sample response model) filtering. When the local and received clock are synchronized, the phase relation stays constant over time. When the phase value becomes negative and wraps around to $N_o$, one additional sample is removed from the resampler delay line and inserted at the head of the voice decoder output FIFO.

When the receive clock is not available, such as voice over packet networks applications, the FIFO voice codeword storing device fill status can control the resampling rate. When the FIFO voice codeword storing device size exceeds a threshold, the phase value may be periodically increased to increase the rate at which the FIFO is emptied.

DETAILED DESCRIPTION OF THE INVENTION

For purposes of the description and claims relative to the system of the present invention, the following terms shall have the meanings set forth below.

Definitions

Frame: This is a group of bits that make up an elementary block of data for transmission by certain protocols.

Collapse: This is a loss of information due to a delay or lack of information received by the receiving unit.

Asynchronous: This is a transmission of data in which each character is a self contained unit with its own start and stop bits. The intervals between the characters may be uneven.

Isochronous: This is a transmission of data in which the time characteristic of an event or a signal recurs at known time intervals.

FIFO: First In First Out. This is a storage method that retrieves the items stored for the longest time first.

Jitter: This is a variation in transmission delay of signal or display image.

CODEC: This is an electronic circuit or software package that converts voice into digital code (and vice versa) using techniques such as Pulse Code Modulation and Data Modulation.

PCM: Pulse Code Modulation. This is a technique for digitizing speech by sampling the sound waves and converting each sample into a binary number.

ISR: Interrupt Service Routine. This is a software routine that is executed in response to an interrupt.

PIU: PCM Interface Unit: This is an interface between the PCM and the Resampler software or hardware.

FIR: Finite Impulse Response. This is a system that is based on a unit sample response model.

DSP: Digital Signal Processing. This is a category of techniques that analyze signals from a wide range of sources, such as voice and weather satellites. It converts the signals into digital data and analyzes it using various algorithms such as Fast Fourier Transform.

Phase Lock Loop: This is a hardware device that synchronizes clocks across a networked system.

TxSeq: Transmitter Sequence.

TxVoice: Transmitter Voice.

TxPacket: Transmitter Packet.

RxPacket: Receiver Packet.

RxSeq: Receive Sequence.

Overview

Figure 1:
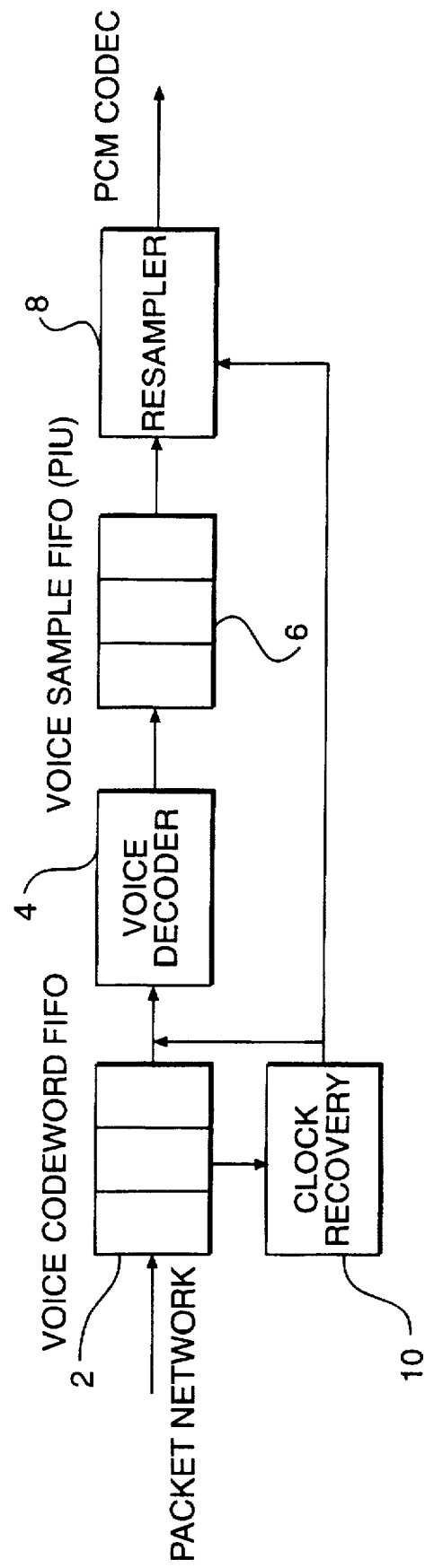
FIG. 1 is a Functional Block Diagram.

FIG. 1 shows a functional block diagram of the present invention. In general a transmitting unit transmits packet sequences, via a transmitter, to a receiving unit. The receiving unit, thereafter receives the packet sequences, via a receiver. The packet stream contains data that allows the receiving unit to synchronize its clock frequency to the transmitting clock's frequency so as to avoid timing jitters and data loss.

More particularly, a Voice Codeword FIFO 2 receives packet sequences, i.e., data streams, from a transmitting unit (not shown in this figure) before Playout to remove timing jitter from the incoming packet sequence. Each packet from the data network is written into the Voice Codeword FIFO 2 as soon as the packet is received from the receiving unit. The received packet in the Voice Codeword FIFO 2 is then removed by a Clock Recovery Module 10, wherein the Clock Recovery Module 10 generates a phase continuous packet clock to remove the packet sequences from the Voice Codeword FIFO 2. The Clock Recovery Module 10 frequency is synchronized to the incoming data rate using the fill status of the Voice Codeword FIFO 2 as a frequency control signal. The packet sequence is then routed to a Voice Decoder 4 from the Voice Codeword FIFO 2. To maintain proper flow control of the Voice Sample FIFO 6 at the Voice Decoder 4 outlet, changes in the packet Playout rate are duplicated at the output of the Voice Sample FIFO 6 using a Continuous-phase Resampler 8. The Continuous-phase Resampler 8 removes timing frequency offset without causing packet sequence slips or loss of data for voice or Voiceband modem signals.

Packet Playout

Voice packetization protocols (such as the above described) for Frame Relay and Asynchronous Transfer Mode (ATM) networks utilize a "sequence number field" located in the header of the transmit packet sequence stream—also referred to as packet streams or packets—to maintain temporal integrity of transmitted data, typically voice transmission, during Playout. As way of example, if a voice segment is transmitted having the sequence numbers {1,2,3,4} and the sequence {1,2,4} is received, Playout software of the present invention will delay "4" until "3" is received. Using this approach, it is preferred that the transmitter insert the contents of a free-running modulo-16 packet counter into each transmitted packet, allowing the receiver to detect lost packets and to properly reproduce silence intervals during Playout—i.e., RxClock continues to run even though voice Playout is not being transmitted.

The software of the present invention exploits the sequence number scheme of the received packets in several ways during Playout. First, if the software of the present invention detects the loss of at least one packet, the system inserts a "last packet replay request" into the Voice Codeword FIFO 2. The Voice Decoder 4 replays the last packet given the "last packet replay request." For example, if a voice segment is transmitted having the sequence numbers {1,2,3,4} and the sequence {1,2,4} is received, Playout software of the present invention inserts {1,2,L,4} into the Voice Codeword FIFO 2 for Playout, where L denotes the last packet replay packet.

The software of the present invention uses the sequence number of the packets to maintain the proper duration of silence intervals. During silence periods, the transmitter continues to increment its sequence counter even though it does not transmit packets, e.g. voice data. Therefore, the sequence number of the first packet of the voice segment following the silence interval indicates to the receiver the duration of the silence interval. The receiver duplicates this silence interval during Playout by inserting an appropriate delay into the Voice Codeword FIFO 2 when this packet is received.

Figure 5:
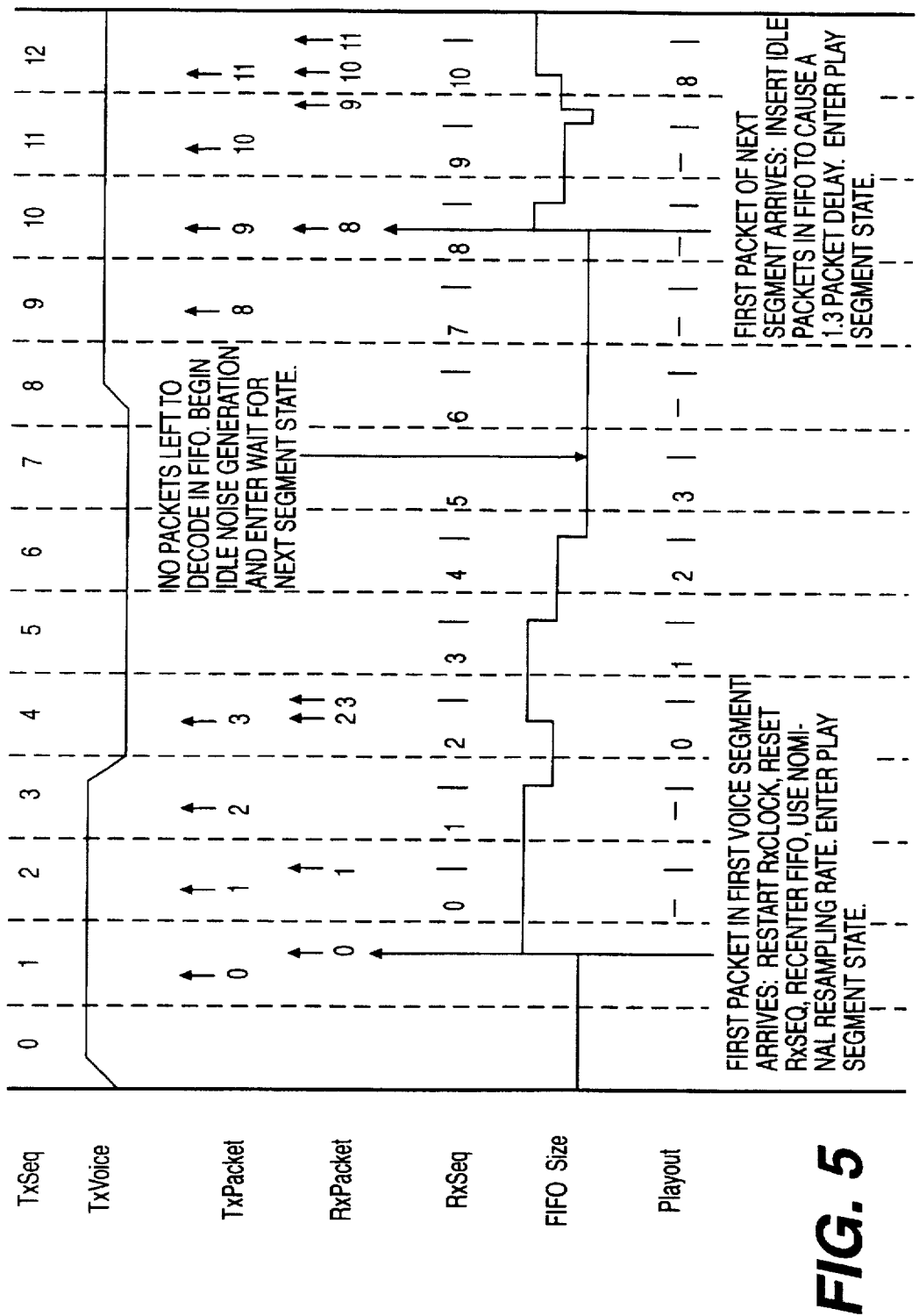
FIG. 5 is a VPU Playout Timing Diagram.

Referring to FIG. 5 an illustrative embodiment of the software of the present invention using a receive sequence counter that increments at the local packet rate to schedule Playouts for multiple voice segments is shown. Row "TxSeq" shows the sequence counter in the transmitter. Rows "TxVoice", "TxPacket", "RxPacket", and "RxSeq" shows packets sent from the transmitter during periods of voice activity, and how jitter affects the packet arrival rate. Row "FIFO Size" shows the receive sequence counter, RxSeq, as it is updated by the software of the present invention. Upon arrival of the first packet in the first voice segment, the software of the present invention sets RxSeq equal to the sequence number of the incoming packet and inserts a delay of several packets into the Voice Codeword FIFO 2 before inserting the first codeword of the segment. The Voice Codeword FIFO 2 delay has the effect of centering the Voice Codeword FIFO 2 in order to smooth out jitter during Playout. After centering the Voice Codeword FIFO 2, the entire voice segment comprising packets 0–3 is played out at a uniform rate, as row "Playout" shows. The Voice Codeword FIFO 2 empties after packet 3 is decoded, causing low-level white noise to be generated until the arrival of packet 8, the first packet of the next voice segment.

When packet 8 arrives, the Voice Codeword FIFO 2 size is preferably set to 1.3 packets to replicate the correct silence interval between the two voice segments. This is accomplished by placing at least two idle packets into the Voice Codeword FIFO 2 before inserting packet 8 and by letting the local packet clock free-run instead of initializing it at the beginning of the voice segment. That is, the free-running counter increments at the transmitter even if a packet is not sent, as is the case during silence intervals. Alternate embodiments using other appropriate timing frequencies, FIFO sizes inserts, silence intervals, and packet inserts are envisioned.

Figure 2:
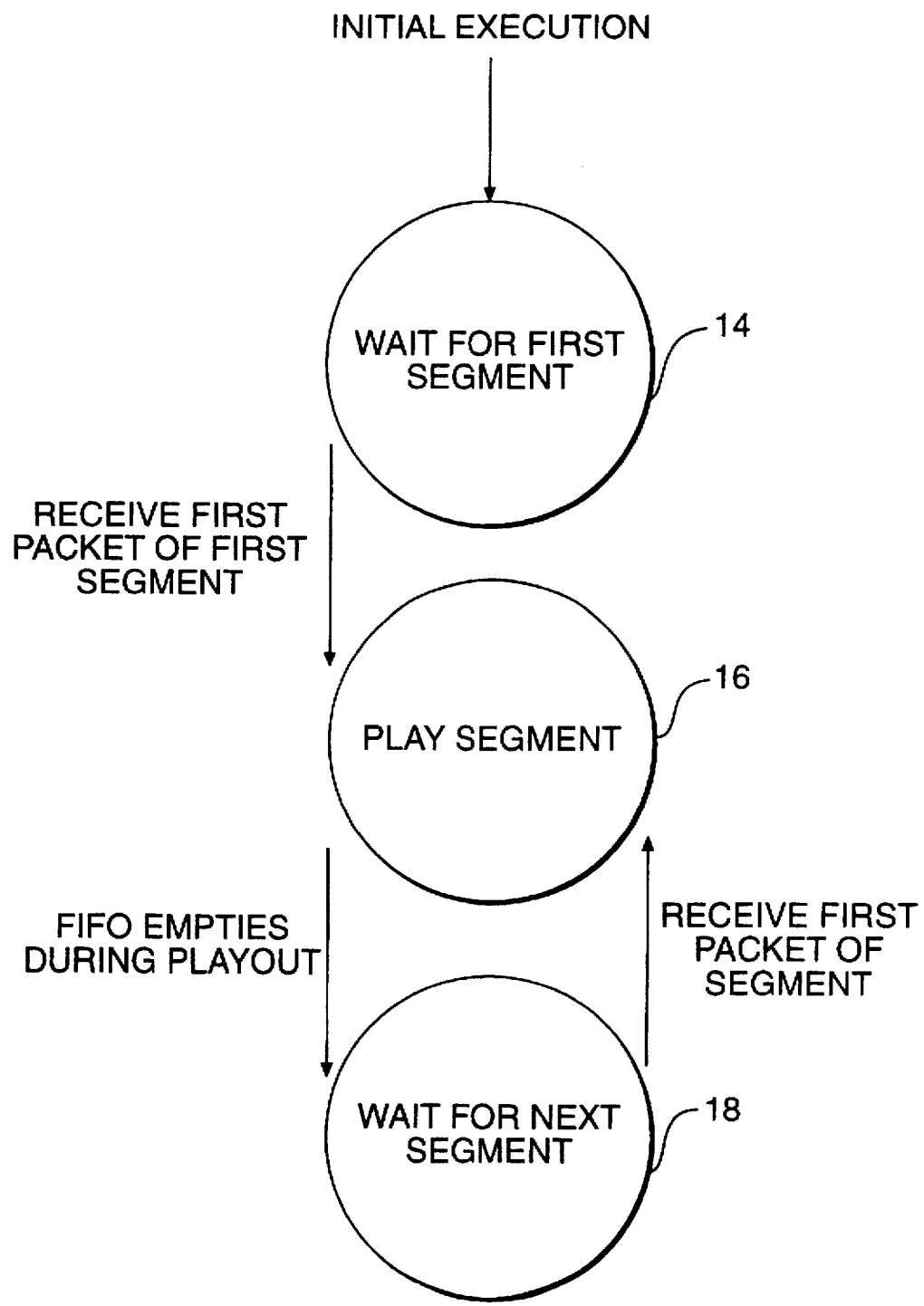
FIG. 2 is a Voice Playout State Machine.

The Playout procedure is further described in FIG. 2 which illustrates a Voice Playout state machine. Specifically, the "Wait For First Segment" state 14 is used preferably when the voice mode begins. The "Play Segment" state 16 is entered after the first packet of a voice segment is received. The "Play Segment" state 16 is employed until the Voice Codeword FIFO 2 empties, either due to the end of a voice segment or to an unusually large delay in the network. The clock frequency recovery is performed in this state. The "Wait For Next Segment" state 18 commands the Voice Decoder 4 to play idle noise in this state. Upon arrival of the first packet of a voice segment, a VPU (unsynchronized voice Playout) exits this state and inserts a delay into the Voice Sample FIFO 4 before resuming Playout.

Normally, the RxPacket clock free-runs in the "Wait For Next Segment" state 14. When the first packet of a voice segment arrives, its sequence number is compared to the current value of RxSeq and a delay is inserted into the Voice Codeword FIFO 2 in order to reproduce the correct silence interval between the current and previous voice segments. In some instances it is preferred that the Playout procedure be reset as is done when the first voice segment arrives. It is preferred that the Playout procedure reset in the following instances:

1. When the difference between RxSeq and the sequence number of the first packet of a voice segment lies outside an acceptable range.
2. When the Voice Codeword FIFO 2 becomes too large—i.e., its size exceeds a specified threshold during Playout in the "Play Segment" state 16. In this case, several voice packets are discarded in order to re-center the Voice Codeword FIFO 2 and the Playout procedure is reset.
3. When a loss of more than one packet occurs during Playout in the "Play Segment" state 16. In this case, "last packet replay requests" are inserted into the Voice Codeword FIFO 2.

Clock Frequency Recovery

Clock frequency recovery is needed in applications where the isochronous, asynchronous, voice or Voiceband data packets rates at the receiver differs from the rate at which they are generated at the transmitter.

During Playout, the software of the present invention periodically monitors the fill status of the Voice Codeword FIFO 2. If the average Voice Codeword FIFO 2 size is gradually increasing, the software of the present invention corrects this situation by slightly increasing the packet Playout rate. If the average Voice Codeword FIFO 2 size is gradually decreasing, the software of the present invention corrects this situation by slightly decreasing the packet Playout rate. Since any change in the packet Playout rate also affects the fill rate of the PCM sample FIFO, i.e. Voice Sample FIFO 4, the same rate change must be applied to the output of this buffer as well. Thus, the software of the present invention permits an almost arbitrary change in the sampling rate of the receiving packets without distorting the resulting analog signal after Playout.

The software of the present invention (in this particular instance the portion of the software that monitors clock recovery) monitors the fill status of the Voice Codeword FIFO 2 preferably in the "Play Segment" 16 state. Each time a packet arrives the fractional Voice Codeword FIFO 2 packet size is recorded. The equation to determine packet size is:

size=FIFO size in packets (integer)−RxClock/N where N is the number of PCM samples per packet interval, and RxClock, a modulo-N counter, is the packet Playout clock.

Figure 3:
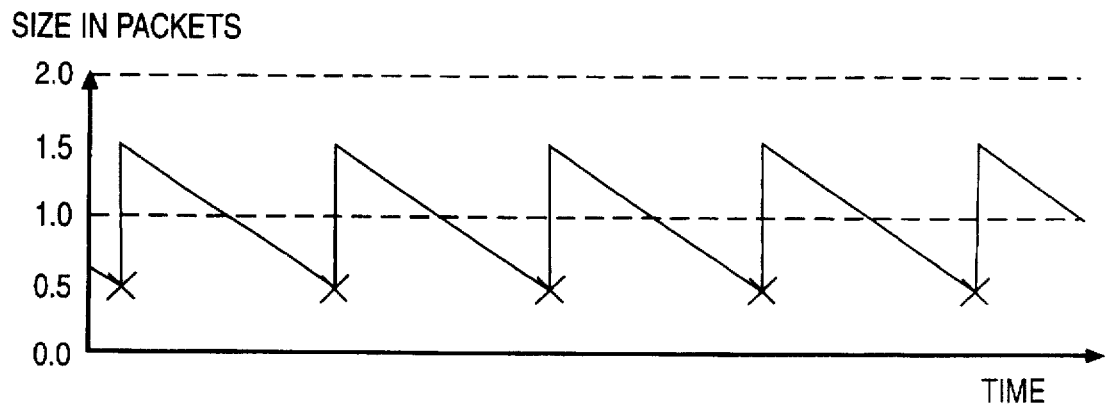
FIG. 3 is a Fractional FIFO size vs. Time in a Jitter free System Diagram.

Each time the RxClock (Receiving Clock) decrements to be equal to zero ("0"), a packet is removed from the Voice Codeword FIFO 2. In a jitter-free system as shown in FIG. 3, the Voice Codeword FIFO 2 size is constant over consecutive measurement intervals, but slowly increases or decreases due to frequency offset in the transmitter's clock versus the RxClock. The "X's" in the figure indicate where the Voice Codeword FIFO 2 size is sampled using the above equation. When jitter is present, the size measurement should be averaged over a block of consecutive packets.

Figure 4:
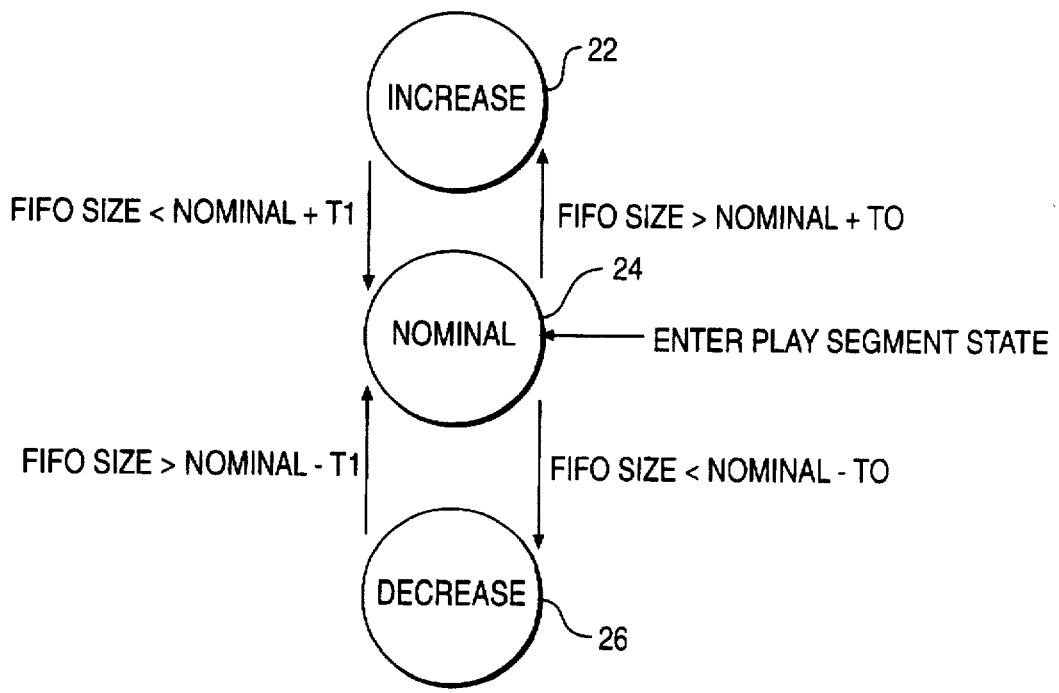
FIG. 4 is a Clock Recovery State Diagram.

The clock recovery software of the present invention updates the packet Playout rate in order to keep the average Voice Codeword FIFO 2 size within reasonable limits. The state diagram as shown in FIG. 4 illustrates how the average Voice Codeword FIFO 2 size remains within reasonable limits. The "Nominal Clock Recovery" state 24 is used whenever a transition is made into the "Play Segment" state 14 (FIG. 2). If the average Voice Codeword FIFO 2 size exceeds the nominal Voice Codeword FIFO 2 center point plus a threshold, the Playout rate is increased to nominal plus T0 and the "Increase Clock Recovery" state 22 is entered. When the Voice Codeword FIFO 2 size returns to an acceptable level, the "Nominal Clock Recovery" state 24 is reentered and the nominal Playout rate is used. If the average Voice Codeword FIFO 2 size falls below the nominal Voice Codeword FIFO 2 center point minus a threshold, the Playout rate is decreased to nominal minus T1 and the "Decrease Clock Recovery" state 26 is entered. When the Voice Codeword FIFO 2 size returns to an acceptable level, the "Nominal Clock Recovery" state 24 is reentered and the nominal Playout rate is used. It is preferred that T1=T0, and in the preferred embodiment T1 and T0 equals 250 ppm.

The increased Playout rate is implemented inside the PCM sample ISR by periodically advancing the RxClock as well as the PIU Resampler phase. For example, for a packet duration of 22.5 ms, the number of samples per packet is 180. A 250 ppm increase to the RxClock may be realized by incrementing RxClock twice (instead of once) every 4,000 PCM samples. A 250 ppm increase in the sampling rate may be realized by incrementing the PIU Resampler phase every 4000/32=125 PCM samples.

Resampler

In the preferred embodiment the Voiceband signals entering and exiting the PCM CODEC are sampled using the same 8 KHZ sample clock. In a Plesiochronous system the preferred Voiceband signal received from the Voice Decoder 4 contains samples generated using the far-end 8 KHz sample clock (RxClock), which drifts in frequency with relation to the local clock.

Figure 6:
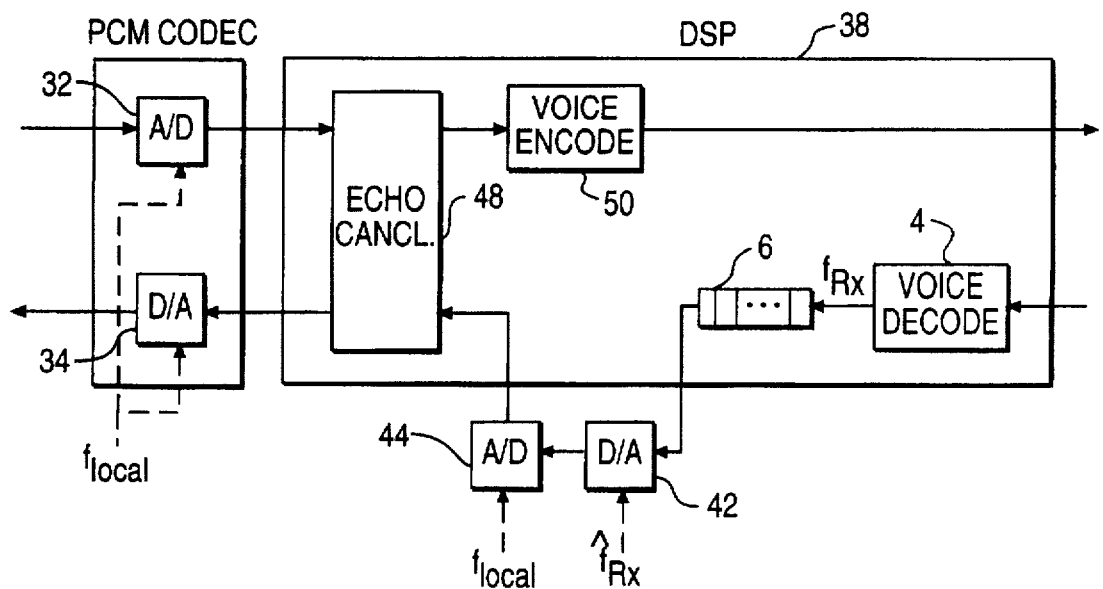
FIG. 6 is a Hardware Resampler.
Figure 7:
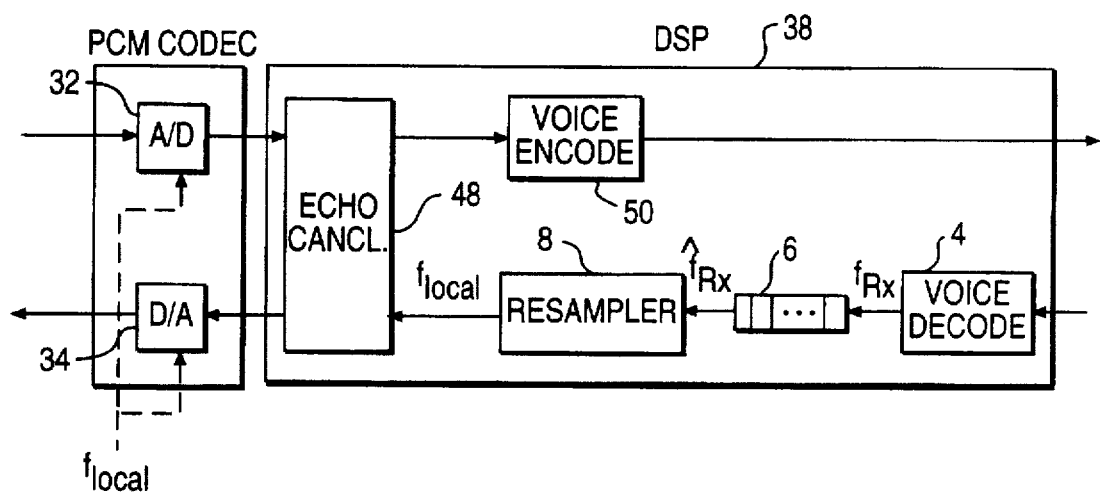
FIG. 7 is a Software Resampler.

FIG. 6 shows an illustrative embodiment of a hardware Resampler which does not suffer from abrupt data loss, jitter, "pops" or "clicks." A D/A 34 and an A/D 32 are located in a PCM CODEC 30 both of which are clocked using a local clock rate, $f_{local}$, preferably at 8 KHz. The samples from the A/D 32 are routed into an echo canceler 48 located in a DSP 38. The DSP 38 further comprises a voice encoder 50, the voice decoder 4, and the Voice Sample FIFO 6. Thereafter the voice transmission, e.g., isochronous or asynchronous transmissions, is fed into the voice encoder 50, and finally into the data network. The samples from the voice decoder 4 are then fed into the Voice Sample FIFO 6 at the far-end sample rate $f_{Rx}$. The samples are then removed from the Voice Sample FIFO 6 and sent to a D/A 42. The D/A 42 is preferably clocked at the rate of $f_{1Rx}$. The D/A 42 output is lowpass filtered and thereafter sent to the A/D 44, using the local clock frequency. It is preferred that the D/A clock $f_{1Rx}$ is adaptively adjusted so that its average rate is equal to the far-end sample rate, preferably utilizing a phase lock loop to synchronize $f_{1Rx}$ to the RxClock. Thus, avg $(f_{Rx})$=avg $(f_{1Rx})$ In the preferred embodiment, as depicted in FIG. 7, a software Resampler is utilized to prevent data loss, jitter, "pops" or "clicks." In this embodiment the D/A 34 and the A/D 32 are clocked using a local clock rate, $f_{local}$, preferably at 8 KHz. The samples from the A/D 32 are routed into the echo canceler 48 located in the DSP 38. In this embodiment the DSP 38 further comprises the voice encoder 50, the voice decoder 4, the Voice Sample FIFO 6, and the Resampler 8. The voice transmission is fed into the voice encoder 50, and into the data network. The samples from the voice decoder 4 are then fed into the Voice Sample FIFO 6 at the far-end sample rate $f_{Rx}$. The samples from the Voice Sample FIFO 6 are then removed and sent to the Resampler 8, preferably clocked at the rate of $f_{1Rx}$. It is preferred that the Resampler 8 clock $f_{1Rx}$ is adaptively adjusted so that its average rate is equal to the far-end sample rate, preferably utilizing the Voice Codeword FIFO 2 fill status to adjust $f_{Rx}$ to the RxClock. In this instance the $f_{1Rx}$ is slightly increased when the Voice Codeword FIFO 2 becomes too large. Alternatively the $f_{Rx1}$ is slightly decreased when the Voice Codeword FIFO 2 becomes too small. The local clock rate is synchronized to the D/A 34 local clock rate, $f_{local}$ prior to entering the echo cancellation 48 which, in turn, enters the D/A 34. Thus, the Resampler synchronizes the incoming frequency to match the outgoing frequency—i.e., data exiting the Resampler 8 at clock rate $f_{local}$ is equal to the data entering the D/A 34 at the local clock rate, $f_{local}$.

In the software Resampling embodiment, the received voice signal at the input to the Resampler 8 is oversampled by a factor of N using FIR filtering. The Resampler output for a particular local clock cycle occurs at one of N phases with respect to the RxClock.

Figure 8:
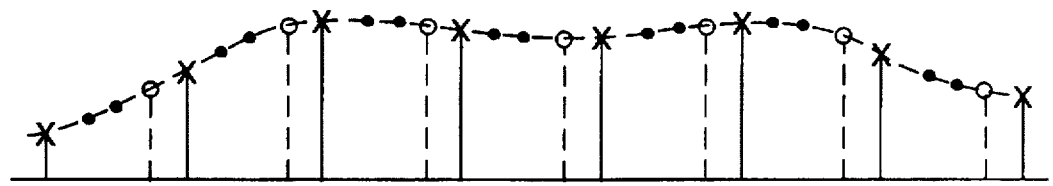
FIG. 8 is a Resampling Diagram using 4 times Oversampling.
Figure 9A:
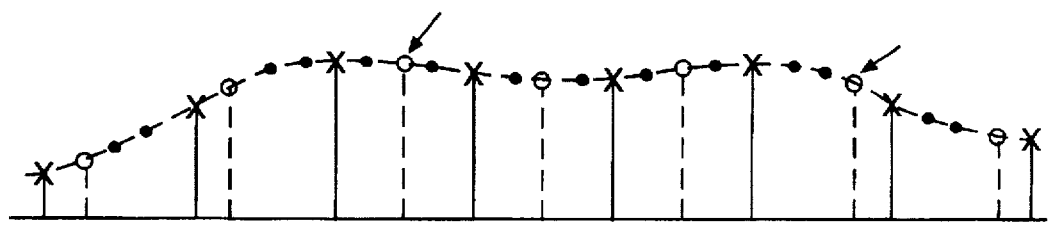
FIG. 9a is a Resampling Diagram for a Asynchronous System when the Receive Clock Rate Exceeds the Local Clock Rate.
Figure 9B:
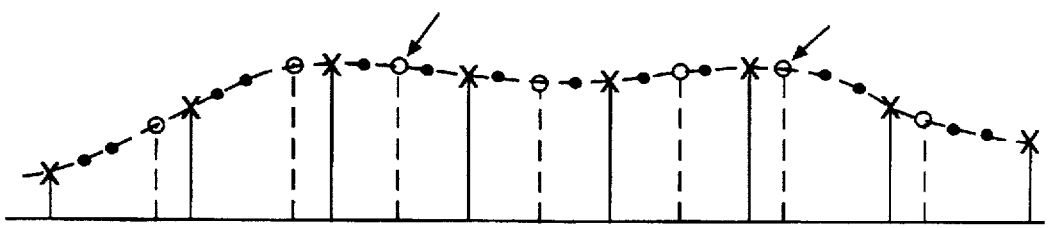
FIG. 9b is a Resampling Diagram for a Asynchronous System when the Local Clock Rate Exceeds the Receive Clock Rate.

An example of oversampling for N=4 is shown in FIG. 8. In this figure input samples are represented by "x's" and output samples are represented by "o's". When the local clock and the RxClock are synchronized, the phase relation remains constant over time. FIG. 9a depicts the phase relation as it slowly increases over time when the RxClock is slightly faster than the local clock. In this scenario, the delay from the "x" samples to the "o" samples increases as well. FIG. 9b. shows the received clock slower than the local clock. In this instance, the phase slowly decreases over time and the delay from the "x" samples to the "o" samples decreases as well.

In the preferred embodiment the Resampler uses an Oversampling factor of N=32. The Resampler is implemented as a 32 tap FIR filter which delays its input by n/32 samples, n=0, 1, . . . , 31. The parameter n specifies the phase of the output sample clock with respect to the input sample clock. During Resampling, when the phase value exceeds n=31 and wraps around to n=0, one additional sample is removed from the voice decoder output FIFO and inserted into the Resampler delay line. Also, when the phase value becomes negative and wraps around to 31, one additional sample is removed from the Resampler delay line and inserted at the head of the Voice Decoder Output FIFO 4.

In applications where a receive clock is available from the data network, it is convenient to use hardware to measure the phase of the local clock with respect to the receive clock with a 1/32 sample granularity. The DSP can then periodically (every 10 ms or so) read in this phase value and apply it to the Resampler. When used in this way, the system performs very much like the hardware resampler of FIG. 8.

When the receive clock is not available, such as voice-overpacket networks applications, one can use the FIFO fill status to control the resampling rate as described previously. When the FIFO size exceeds a threshold, the phase value should be periodically increased modulo 32 to increase the rate at which the FIFO is emptied. One can increase the rate by 250 ppm, for example, by increasing the phase value by 1 modulo 32 every 125 samples.

Preferred and alternative embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the present invention, be apparent to persons of ordinary skill in the art.

What is claimed is:

1. A System for Voice Playout in an Asynchronous Packet Network comprising:
   (a) a transmitting unit comprising a transmitting clock;
   (b) a receiving unit comprising a receiving clock and a FIFO voice codeword storing device having a fill status; and
   (c) an incoming packet sequence stream comprising the fill status of said FIFO voice codeword storing device which is transmitted from said transmitting unit to said receiving unit, wherein said incoming packet sequence stream synchronizes said transmitting unit's transmitting clock with said receiving unit's receiving clock by detecting said fill status.

2. The Voice Playout System of claim 1 wherein said receiving unit further comprises a phase continuous packet clock recovery module which receives said incoming packet sequence streams from said FIFO voice codeword storing device.

3. The Voice Playout System of claim 1 wherein said receiving unit further comprises a voice decoder which receives said incoming packet sequence streams from said FIFO voice codeword storing device.

4. The Voice Playout System of claim 3, wherein said receiving unit further comprises a voice sample FIFO which receives said incoming packet sequence streams from said voice decoder.

5. The Voice Playout System of claim 4, wherein said receiving unit further comprises a continuous-phase resampler which receives said incoming packet sequence streams from said voice sample FIFO and said phase continuous packet clock recovery module.

6. The Voice Playout System of claim 1 wherein said incoming packet sequence stream comprises a header which includes a sequence number scheme to maintain temporal integrity of transmitted data during Playout.

7. The Voice Playout System of claim 5, wherein said continuous-phase resampler comprises:
   (a) PCM Codec having an A/D and a D/A, wherein said A/D and said D/A are clocked at a local frequency; and
   (b) a digital signal processor internetworked to said PCM Codec, said digital signal processor comprises an echo canceler, a voice encoder, said voice decoder, said voice sampler FIFO, and said continuous-phase resampler.

8. The Voice Playout System of claim 6 wherein said sequence number scheme includes a last packet replay request during Playout for synchronization of data transmissions between said transmitting unit and said receiving unit.

9. A method of transmitting and recovering data in a System for Voice Playout in an Asynchronous Packet Network comprising:

(a) inserting a sequence scheme into incoming packet sequence streams, wherein said incoming packet sequence streams have an incoming data rate;

(b) transmitting said incoming packet sequence streams from a transmitting unit;

(c) receiving said incoming packet sequence streams into a receiving unit;

(d) analyzing said incoming packet sequence streams in said receiving unit;

(e) removing timing jitter from said incoming packet sequence streams;

(f) synchronizing said incoming packet sequence streams received in said receiving unit with said incoming packet sequence streams that were transmitted from said transmitting unit by using the fill status of a FIFO voice codeword storing device; and (g) playing said synchronized incoming packet sequence streams at playout.

10. The method of transmitting and recovering data in a System for Voice Playout in an Asynchronous Packet Network as recited in claim 9 wherein said inserting a sequence scheme into incoming packet sequence streams comprises:

(a) inserting a sequence number field located at a header of said incoming packet sequence scheme;

(b) inserting a last packet replay request into a FIFO voice codeword; and (c) replaying said last packet replay request to synchronize said incoming packet sequence transmission between said transmitting unit and said receiving unit.

11. The method of transmitting and recovering data in a System for Voice Playout in an Asynchronous Packet Network as recited in claim 10 wherein said inserting a sequence scheme into said incoming packet sequence streams further comprises:

(a) incrementing said sequence scheme at said transmitting unit following a silence interval;

(b) receiving said sequence scheme in said receiving unit; and (c) inserting a delay in said FIFO voice codeword, wherein said delay indicates to said receiving unit the duration of said silence interval.

12. The method of transmitting and recovering data in a System for Voice Playout in an Asychronous Packet Network as recited in claim 11 wherein said inserting a delay in said FIFO voice codeword comprises (a) centering said FIFO voice codeword;

(b) playing said incoming packet sequence stream in a uniform rate; and (c) generating white noise until another incoming packet sequence stream is received by said receiving unit.

13. The method of transmitting and recovering data in a System for Voice Playout in an Asynchronous Packet Network as recited in claim 11 wherein said inserting a delay in said FIFO voice codeword comprises:

(a) placing at least two idle incoming packet sequence streams into said FIFO voice codeword prior to receiving said another incoming packet sequence stream; and (b) allowing a local packet clock to free-run so that said silence intervals are synchronized between said transmitting unit and said receiving unit.

14. The method of transmitting and recovering data in a System for Voice Playout in an Asynchronous Packet Network as recited in claim 10 wherein said FIFO voice codeword storing device removes jitters from said incoming packet sequence streams.

15. The method of transmitting and recovering data in a System for Voice Playout in an Asynchronous Packet Network as recited in claim 10 wherein a phase continuous packet clock recovery module is synchronized to the incoming data rate using a fill status of said FIFO voice codeword as a frequency control signal.

16. The method of transmitting and recovering data in a System for Voice Playout in an Asynchronous Packet Network as recited in claim 15 wherein a continuous-phase resampler connected to the output of a voice sample FIFO duplicates changes in said incoming packet sequence streams.

17. A method of transmitting and recovering data in a System for Voice Playout in an Asynchronous Packet Network comprising:

(a) entering a wait for first segment state;

(b) receiving an incoming packet sequence stream from a FIFO voice codeword storing device, having a fill status, an incoming data rate, and a sequence number;

(c) entering a play segment, wherein the performance of a receiving unit's clock frequency recovery rate is rendered in said play segment state by using the fill status of the FIFO voice codeword storing device;

(d) emptying said incoming packet sequence stream from a voice codeword FIFO for synchronized data playout; and (e) entering a wait for next segment state to wait for a next incoming packet sequence stream.

18. The method of transmitting and recovering data in a System for Voice Playout in an Asynchronous Packet Network as recited in claim 17 wherein said wait for next segment further comprises:

(a) permitting a receive packet clock frequency to free-run;

(b) comparing the sequence number of said incoming packet sequence stream to a current receiving sequence; and (c) inserting a delay into said voice codeword FIFO in order to reproduce a silence interval; and (d) playing data playout of a synchronized data transmission.

19. The method of transmitting and recovering data in a System for Voice Playout in an Asynchronous Packet Network as recited in claim 18 wherein said receive packet clock updates said incoming data rate so that an average voice codeword FIFO can stay centered.

20. A method of transmitting and recovering data in a System for Voice Playout in an Asynchronous Packet Network comprising:

(a) an incoming packet sequence stream entering a D/A, said D/A having a frequency clocked at a local sample rate;

(b) routing incoming packet sequence stream from said D/A to an echo canceler;

(c) feeding said incoming packet sequence stream from said echo canceler into a voice encoder;

(d) feeding said incoming packet sequence stream from said voice encoder into a data network;

(e) receiving said incoming packet sequence stream from said data network into a voice sample FIFO, said voice sample FIFO having a frequency clocked at a far end sample rate;

(f) removing said incoming packet sequence stream from said voice sample FIFO into a resampler;

(g) synchronizing said incoming packet sequence stream in said sample local clock rate;

(h) allowing said incoming packet sequence stream to enter said echo canceler at said sample local clock rate; and (i) permitting said incoming packet sequence stream to enter a D/A at said sample local clock rate for synchronized Playout.

* * * * *